Dec. 30, 1924.

F. A. STEVENS 1,520,979

OPHTHALMIC MOUNTING

Original Filed June 22, 1921

Inventor:-
Frederick A. Stevens
by David Rines
Attorney;-

Patented Dec. 30, 1924.

1,520,979

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Original application filed June 22, 1921, Serial No. 479,480. Divided and this application filed September 9, 1922. Serial No. 587,077.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings comprising lens-holding rims, and more particularly to mountings of the all-"shell" type, constituted of non-metallic material, like celluloid, zylonite and the like. The present application is a division of a copending application, Serial No. 479,480, filed June 22, 1921.

As the non-metallic material, though more or less resilient, is not sufficiently so to permit mounting lenses within the endless rims at ordinary temperatures, it is necessary to apply heat, which permits of stretching or expanding the rims to increase temporarily their calibre. This is a drawback, for besides the inconvenience attending the heat application, the mounting may become distorted in consequence; in fact, it frequently cracks as a result.

Endless non-metallic rims have been heretofore proposed so constructed as to permit lenses to be inserted within them by temporarily springing back resilient segmental members that are allowed to return by their resiliency into their normal places after the lens has been forced into its seat. The temporary springing back of the segmental members serves to increase for the moment the calibre of the groove, permitting entry of the lens. Owing to the resilient nature of the segmental members, however, they can not hold the lens tightly in place, so that additional metal clamping members have been needed to clamp the non-metallic rim against the lens, and thereby prevent accidental rotation of the lens within its seat.

The chief object of the present invention is to provide an ophthalmic mounting comprising endless rims constituted of non-metallic material within the rims of which lenses may be tightly, non-rotatably mounted without the necessity of previously expanding or stretching the non-metallic material.

With this and other objects in view, the invention consists of the improved ophthalmic mounting hereinafter described, illustrated in the accompanying drawings and defined in the appended claims.

Figure 1:
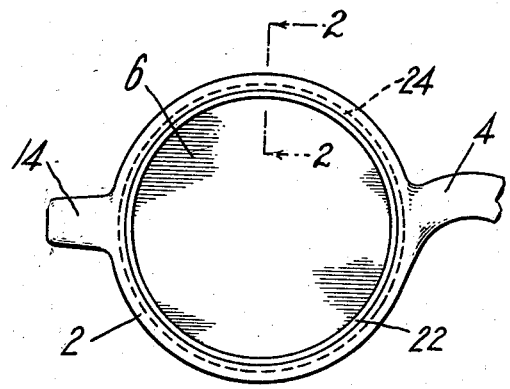
Figure 2:
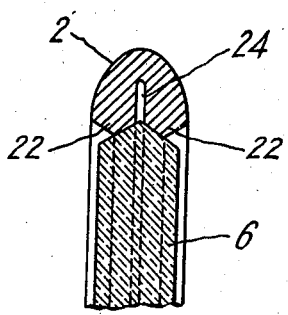

In the drawings, Fig. 1 is a view in front elevation of a portion of a spectacle mounting constructed according to the present invention; and Fig. 2 is a section taken upon the line 2—2 of Fig. 1.

Ophthalmic mountings of the above-described character, constituted of non-metallic, resilient material, like celluloid, zylonite and the like, comprise two endless rims 2 (one only is shown in the drawings) integrally connected together by a bridge 4, and each having integral temple end pieces 14. The bridge and the end pieces need not, however, be integral. They may be made of metal or other material and they may be attached to the rims in any well-known manner. Each rim is provided with an inner lens-receiving groove.

According to the present invention, the lenses may be mounted within the rims without stretching or expanding them, whether by the application of heat or otherwise. To this end, the lens-receiving grooves are shown wider at the mouth 22 than at the throat 24. The portion of the rim near the mouth 22 of the groove constitutes a seat for the lens 6 and is of calibre substantially equal to the diameter of the lens. By carrying the groove back into the throat 24, it becomes possible to spring apart the portions of the rim on opposite sides of the groove. When the opposite portions of the rim are so sprung apart, the lens may readily be inserted, after which the portions of the rim may be permitted to spring back into normal position to hold the inserted lens in place.

As it is unnecessary to distort the rims by heat or otherwise, the mounting will permanently retain its original shape, so that when a properly shaped lens is once properly fitted into a groove of proper size and shape, it will remain properly fitted, neither too loose nor too tight. The dangers of accidental axial derangement of the lens within its groove, caused by the lens being too loose, and of the rim cracking, caused by the lens being too tight in its groove, are thus eliminated.

It will be understood that the invention is not restricted to the exact embodiment thereof that is illustrated in the accompanying drawings and described herein, and that all modifications within the skill of the artisan are considered to be within the spirit and scope of the present invention, as defined in the appended claims.

What is claimed as new is:

1. An ophthalmic mounting comprising an endless rim constituted of comparatively rigid, resilient material that is adapted to be expanded by heat and provided with a lens-receiving groove, the portions of the rim on opposite sides of the groove being constructed and arranged to permit being momentarily sprung apart while in unheated condition to permit mounting a lens within the groove.

2. An ophthalmic mounting comprising an endless rim constituted of comparatively rigid, resilient material that is adapted to be expanded by heat having integral therewith a bridge and a temple end piece and provided with a lens-receiving groove, portions of the rim on the sides of the groove being constructed and arranged to permit being momentarily sprung apart while in unheated condition to permit mounting a lens within the groove.

3. An ophthalmic mounting comprising an endless rim constituted of resilient material and provided with an inner groove the mouth of which is wider than its throat, the portion of the rim near the mouth of the groove constituting a lens seat, and the portions of the rim on opposite sides of the groove being adapted to be momentarily sprung apart to permit mounting a lens within the seat.

In testimony whereof, I have hereunto subscribed my name this 7th day of Sept., 1922.

FREDERICK A. STEVENS.